(No Model.)

D. & C. G. ROWLEY.
STARCHING MACHINE.

No. 245,663. Patented Aug. 16, 1881.

Witnesses:
Walter Fowler
L. M. Thomas.

Inventor:
Denman Rowley
Cecil G. Rowley
per Milo Harris, atty

UNITED STATES PATENT OFFICE.

DEMMON ROWLEY AND CECIL G. ROWLEY, OF JAMESTOWN, NEW YORK.

STARCHING-MACHINE.

SPECIFICATION forming part of Letters Patent No. 245,663, dated August 16, 1881.

Application filed February 19, 1881. (No model.)

*To all whom it may concern:*

Be it known that we, DEMMON ROWLEY and CECIL G. ROWLEY, citizens of the United States, residing at Jamestown, in the county of Chautauqua, and State of New York, have invented certain new and useful Improvements in Starching-Machines; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of our invention is to provide a simple, cheap, and efficient machine for starching collars, cuffs, &c., and one in which the work can be thoroughly done without rubbing or working the starch into the fabrics by hand, and will be readily understood by the following description and the accompanying drawings, in which—

Figure 1:
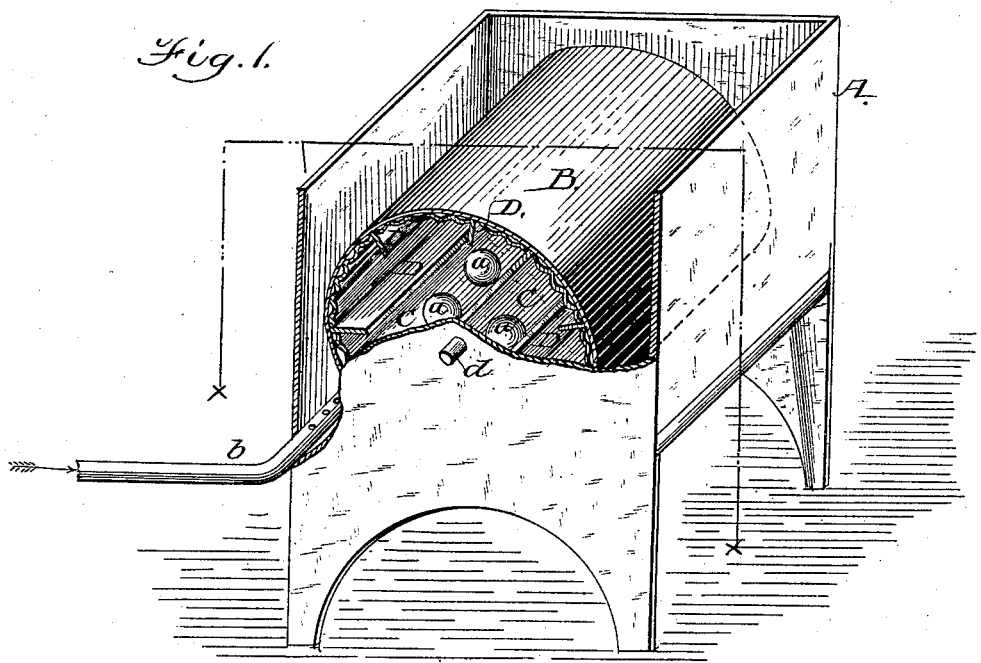
Figure 2:
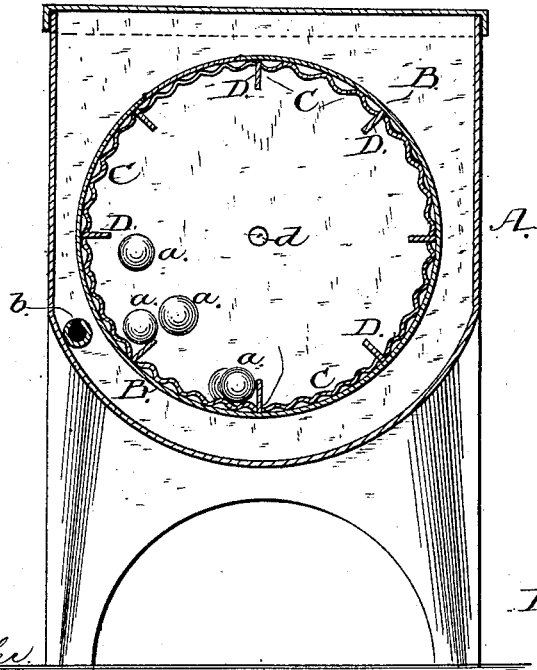

Figure 1 is a perspective view with top removed and portion of end broken away; Fig. 2, section on line *x x*, Fig. 1.

In the accompanying drawings, A represents the outer case of our starching-machine, and may be made of any suitable size or form and properly mounted on legs, when desired.

B is a cylinder placed within said case, being smaller in diameter, so as to leave sufficient space all around for steam between it and the outer case, and has a hinged lid or door on one side, (not shown in the drawings,) and has journals *d* at each end, that have their bearings in the outer case, and extend enough outwardly to receive a crank or a pulley, when desired to be run by power. It is also provided on the inside with ribs D D, securely fastened to its sides, and between these are fastened the rub-boards *c c*. *a a a* are loose balls put within this cylinder, as shown. These balls we generally make of hard wood and of sufficient size to give the desired weight as they fall on the clothes.

*b* represents a steam-pipe that enters the outer case, and is perforated to allow the steam to escape into it.

The practical operation is as follows: Collars, cuffs, &c., with sufficient hot starch, are placed in the cylinder. The desired momentum is given by hand or power. The balls *a a a* are taken up by the ribs D D, and falling on the goods the starch is worked into them more evenly and better than can be done by hand. The starch is kept hot by the steam in the outer case, and this is much better than to let the steam into the starch, as is done with some machines, because when steam comes in contact with the starch it soon gets so thin as to be useless.

Having thus described our invention, what we desire to claim is—

1. In a starching-machine, a steam-chest having an opening and a steam-pipe entering therein, in combination with an internal revolving cylinder with loose balls therein, the cylinder being provided at the ends with suitable bearings, and having internal rub-boards with fixed ribs for carrying the loose balls up the sides, substantially as shown, and for the purpose set forth.

2. In a starching-machine, the combination of steam-chest A, pipe *b*, cylinder B, provided with rub-boards *c c*, ribs D D, and loose balls *a a a* within said cylinder, and arranged to operate substantially as shown, and for the purpose set forth.

In testimony whereof we affix our signatures in presence of two witnesses.

DEMMON ROWLEY.
CECIL G. ROWLEY.

Witnesses:
O. F. PRICE,
MILO HARRIS.